United States Patent [19]
Tashiro

[11] Patent Number: 5,590,371
[45] Date of Patent: Dec. 31, 1996

[54] SERIAL COMMUNICATION CIRCUIT ON AN LSI CHIP AND COMMUNICATING WITH ANOTHER MICROCOMPUTER ON THE CHIP

[75] Inventor: Tetsu Tashiro, Itami, Japan

[73] Assignee: Mitsubishi Denki Kabushiki Kaisha, Tokyo, Japan

[21] Appl. No.: 305,937

[22] Filed: Sep. 19, 1994

[30] Foreign Application Priority Data

Oct. 29, 1993 [JP] Japan .................................. 5-271954

[51] Int. Cl.$^6$ .................................................. G06F 13/00
[52] U.S. Cl. ........................................ 395/821; 395/800
[58] Field of Search ................................. 395/800, 309, 395/310, 200.01, 821, 842, 550

[56] References Cited

U.S. PATENT DOCUMENTS

| | | | |
|---|---|---|---|
| 4,222,116 | 9/1980 | Groves ..................................... | 375/282 |
| 4,667,285 | 5/1987 | Suzuki et al. ........................... | 395/310 |
| 4,704,678 | 11/1987 | May ........................................ | 395/650 |
| 4,967,326 | 10/1990 | May ........................................ | 395/800 |
| 5,199,107 | 3/1993 | Ozawa .................................... | 395/550 |
| 5,307,464 | 4/1994 | Akao et al. ............................. | 395/156 |
| 5,442,800 | 8/1995 | Okamura ................................ | 395/800 |

OTHER PUBLICATIONS

Intel Corp.: MCS–80/85 Family User's Manual, Oct. 1979, Chapter 2.2.8 (pp. 2–5), Chapter 2.3.8 (pp. 2–19, 2–20), "RIM" instruction, SIM instruction (pp. 5–17, 5–18).

*Primary Examiner*—Gopal C. Ray
*Attorney, Agent, or Firm*—Lowe, Price, LeBlanc & Becker

[57] ABSTRACT

A serial communication circuit which is so configured that the sub CPU SC determines a timing of bit formats with software, specificially, that the sub CPU SC controls a level of each section or an output timing of each signal of one unit to be transmitted of data by writing specific values with software to the specific registers 3, 4, 6, 95 and so on, and also at the time of receiving, the sub CPU SC controls with software a level of each section or a timing of taking in data of each signal of one unit. Thereby, it becomes possible for the serial communication circuit to process protocols of different bit formats only by changing firmware.

4 Claims, 9 Drawing Sheets

※( )SHOWS NUMBER OF CLOCK

FIG. 5

| TXD BREAK CHARACTER BIT | DATA ENABLE BIT | TXD PARITY OUTPUT ENABLE BIT | TRANSMIT SIGNAL |
|---|---|---|---|
| 1 | X | X | FORCED "0" |
| 0 | 0 | X | TRUCK BIT |
| 0 | 1 | 0 | TXD DATA BIT |
| 0 | 1 | 1 | PARITY BIT |

NOTE : X SHOWS EITHER OF "1" OR "0".

5,590,371

1

SERIAL COMMUNICATION CIRCUIT ON AN LSI CHIP AND COMMUNICATING WITH ANOTHER MICROCOMPUTER ON THE CHIP

BACKGROUND OF THE INVENTION

1. Field of the Invention

The present invention relates to a serial communication circuit, particularly to a communication circuit, which is built in a one-chip microcomputer and performs serial communication between itself and the other microcomputer.

2. Description of Related Art

The present invention relates to a communication circuit, which performs serial communication on the basis of bit formats of the D2B (Domestic Digital Bus) protocol being one kind of HDLC (High level Data Link Control procedures). The D2B protocol is prescribed as TC84(S)86 by IEC (International Electrotechnical Commission). At first, explanation will be made on the bit format of the D2B protocol.

FIG. 1 is a schematic diagram showing formats of a start bit 102 and of a data bit 103 of one bit of transmit signals to be transmitted from the master side to the slave side of the D2B protocol.

As shown in FIG. 1, in the start bit 102 of the D2B protocol, t1 section of "H" level, t2 section of "L" level, t3 section of "L" level, and t4 section of "H" level are arranged from the head side, and the continuous times of the respective sections are defined by the number of clocks. In addition, the number of clocks shown in FIG. 1 is an example, and it is not limited thereto.

Specifically, in the start bit 102, the t1 section is defined for confirming that it continues "1" for a predetermined time, the t2 section that it becomes "0", the t3 section that it continues "0" for a predetermined time, and the t4 section that it becomes "1". Accordingly, the start bit 102 shown in FIG. 1 represents a start of transmission with four sections from the t1 section to the t4 section as a unit.

As shown in FIG. 1, in the D2B protocol, in one bit of the data bit 103, t1 section of "H" level, t2 section of "L" level, t3 section (hatched portion) which is a section of data to be transmitted, and t4 section of "H" lever are arranged, and the continuous times of the respective sections are defined by the number of clocks. In addition, the number of clocks shown in FIG. 1 is an example, and it is not limited thereto.

Specifically, in the data bit 103, the t1 section is defined for confirming that it continues "1" for a predetermined time, the t2 section that it becomes "0", the t3 section for representing a value of "1" or "0" of the data to be transmitted, and the t4 section that it becomes "1". Accordingly, with four sections from the t1 section to the t4 section with a unit, one bit data of "1" or "0" is represented.

As shown in FIG. 1, as an example, the point that the different number of clocks is decided in advance as the continuous times in the respective sections is different from other general protocols.

For example, FIG. 2 is a schematic diagram showing a bit pattern of one bit data which is transmitted through a data transmit route defined by bit formats of "Class B data communication network interface J1850".

Each one-bit data is composed of three areas each being called a Time and obtained by dividing one-bit data into three. In bit, "0", as shown in FIG. 2 by reference numeral 100, both the first Time and the second Time are represented

2 by "H" level, and the third Time by "L" level. In bit. "1", as shown in FIG. 2 by reference numeral 101, the first Time is represented by "H" level, and both the second Time and the third Time by "L" level.

Though not shown in FIG. 2, in this protocol, SOF (Start Of Frame) corresponding to a start bit 103 of the D2B protocol is composed of 6 Times, such as that the first to fourth Times are represented by "H" level and fifth and sixth Times by "L" level. Even the D2B protocol, there is a case that, a signal of one unit, is composed of 4 sections or more.

In any case, in the conventional protocol, a signal of one unit obtained by combining "H" level and "L" level having a predetermined width are defined to represent "0" or "1" of one bit or a predetermined meaning, however, in the D2B protocol, the widths (continuous time) in the respective sections are different from each other, and by making the value of the section of the specific width among them is made "0" or 1", thereby representing "0" or "1" of one bit.

As aforementioned, a serial communication apparatus processing conventional bit formats, J1850, for example, is premised on an assumption of a bit format in which data is transferred in synchronism with a predetermined number of clocks, and in the aforementioned example, for example, control can be performed with 8 clocks as a reference. But, such a control cannot be adapted to such a bit format as the D2B. And in the case where an apparatus is constructed with hardware to the bit format to which a specified number of clocks are allocated in order to define widths of such respective sections, the application of the apparatus is limited because it cannot be adopted to the bit format in which the respective sections have different widths.

SUMMARY OF THE INVENTION

The present invention has been devised in view of such circumstances, and the primary object of the invention is to provide a serial communication circuit capable of processing also a protocol of different bit format only by changing firmware, by constructing such a control circuit, that the timing of tile bit format is decided by the software.

And object of the invention for a one-chip microcomputer is to provide a serial communication circuit which lightens a load of the original CPU by providing a sub CPU for an exclusive communication control.

Further, the object of the invention is to provide a serial communication circuit being provided with a parity check function capable of checking either parities of odd number or parities of even number.

Still further, the object of the invention is to provide a serial communication circuit having functions such as checking of a noise included in a received signal, checking whether a signal in a predetermined section is stable or not, or further checking whether there is something abnormal or not in a communication.

In the serial communication circuit of the invention, a level of each section or an output timing of data of each transmitted signal of one unit, is controlled by a control circuit which writes a specific value to a specific register by software. And in receiving, a level of each section or a timing of taking in data of each signal of one unit is controlled by the control circuit with software.

In the serial communication circuit of the invention, a control circuit is configured as a sub CPU on a one-chip microcomputer constructed on an LSI chip.

Further, in the serial communication circuit, of the invention, a parity generator for transmitting is provided which generates parity of each bit of transmit data at the time of transmitting by odd number or even number, and either the parity of odd number or even number can be set by the control circuit. Also at the time of receiving, a parity generator is provided for receiving which generates parity of each bit of a received data by odd number or even number, and either the odd number parity or even number parity can be set by a control circuit can set.

Further, in the serial communication circuit of the invention, means for detecting whether or not a value of a signal inputted from a receiving terminal has changed after a certain time as elapsed.

Accordingly, in the serial communication circuit of the invention, a level of each section or an output timing of data of each transmitted signal of one unit is decided, or a level of each section or a timing of taking in data of each received signal of one unit is decided by a control circuit which writes a specific value to a specific register with software.

And in the serial communication circuit of the invention, a control circuit is configured as a sub CPU of a one-chip microcomputer constructed on an LSI chip and is used exclusively for controlling communication control.

Further, in the serial communication circuit of the invention, parity of each bit of a transmitted data is generated at the time of transmitting by either odd number or even number, and odd number parity or even number parity is set by a control circuit. And also at the time of receiving, parity of each bit of received data is generated either by odd number or even number, and odd number parity or even number parity is also set by the control circuit.

Still further in the serial communication circuit of the invention, by that a value of a signal inputted from a receiving terminal is checked whether it has changed or not after a lapse or a time, checking of a noise included in a received signal, checking whether a signal in a predetermined section is stable or not, or checking whether there is something abnormal in communication or not, are performed.

The above and further objects and features of the invention will more fully be apparent from the following detailed description with accompanying drawings.

BRIEF DESCRIPTION OF THE DRAWINGS

FIG. 3 is a schematic diagram showing an outline configuration of a one-chip microcomputer in which a serial communication circuit related to the invention is built in, FIG. 5 is a table showing a relationship between values written into the respective registers of a circuit on the transmit terminals of a serial communication circuit related to the invention.

DESCRIPTION OF THE PREFERRED EMBODIMENTS

Figure 1:
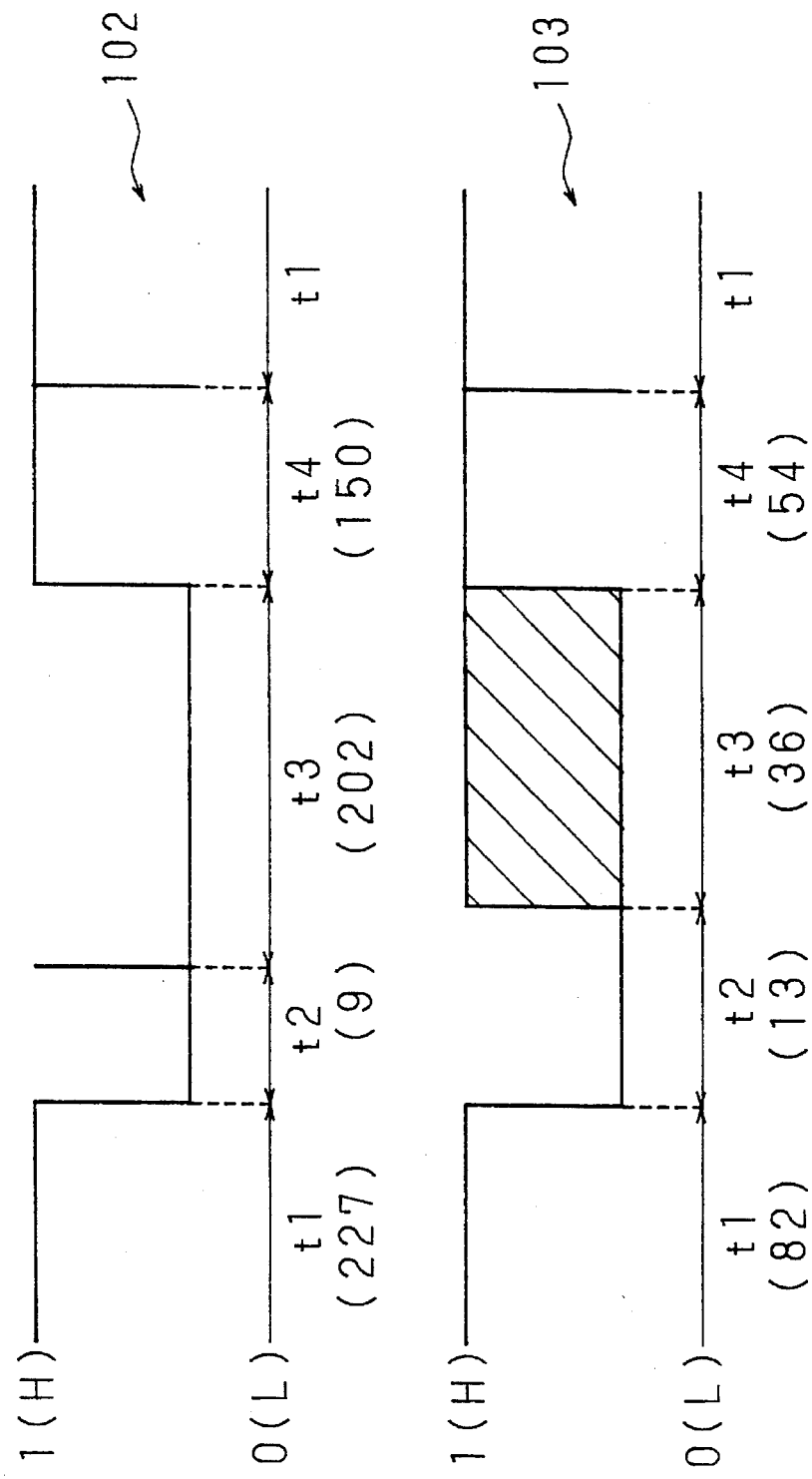
FIG. 1 is a schematic diagram showing an example of bit formats of the D2B protocol which is an object of a serial communication circuit of the invention.
Figure 2:
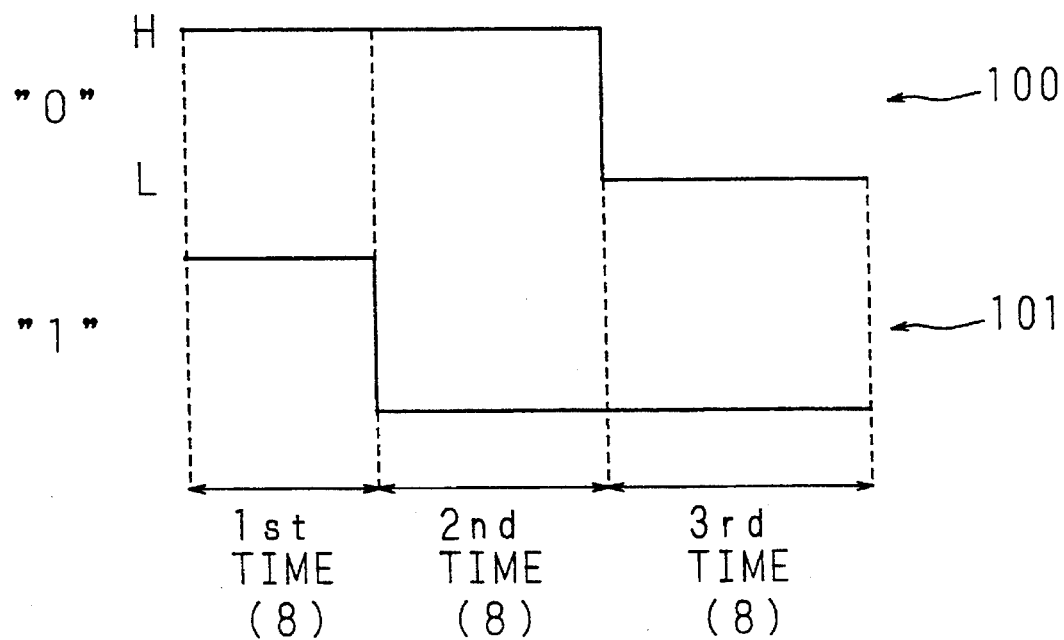
FIG. 2 is a schematic diagram showing bit formats defined in "Class B data communication network interface J1850" as an example of a conventional general bit format.

In the following, explanation will be made on the invention referring to the drawings showing the embodiments thereof.

Figure 3:
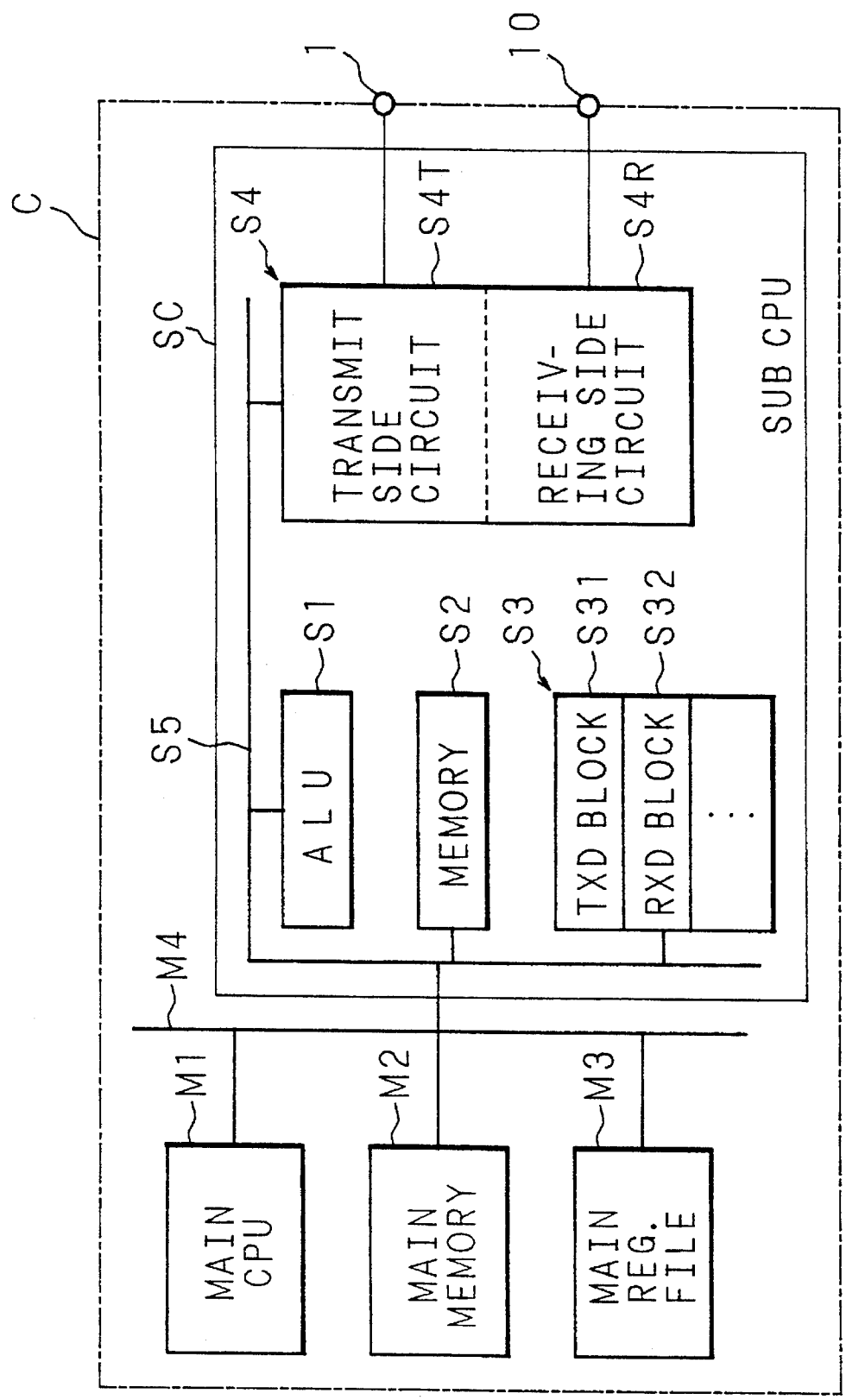

FIG. 3 is a schematic diagram showing an outline configuration of a one-chip microcomputer in which serial communication circuit related to the invention is built in.

In FIG. 3, reference character C designates one LSI, in which a main CPU M1, a main memory M2, a main register file M3, a sub CPU SC, and the like are configured. The respective components in the aforementioned LSI chip C are connected to each other by a main bus M4.

In the sub CPU SC, an ALU S1, a memory S2, a register file S3, a serial communication circuit S4 of the invention and the like are configured. The respective components in the aforementioned sub CPU SC are connected to each other by a sub bus S5.

The serial communication circuit S4 of the invention is, as described later, further divided into a transmit side circuit S4T and a receiving side circuit, S4R. As described later, a transmit terminal 1 is provided to the transmit side circuit S4T, and a receiving terminal 10 is to the receiving side circuit S4R respectively for communication with the outside of the LSI chip C.

And, in the register file S3 of the sub CPU SC, registers such as a TXD block S31 for the transmit side circuit S4T, and an RXD block S32 for the receiving side circuit S4R and the like are provided, however, description will be made later.

Figure 4:
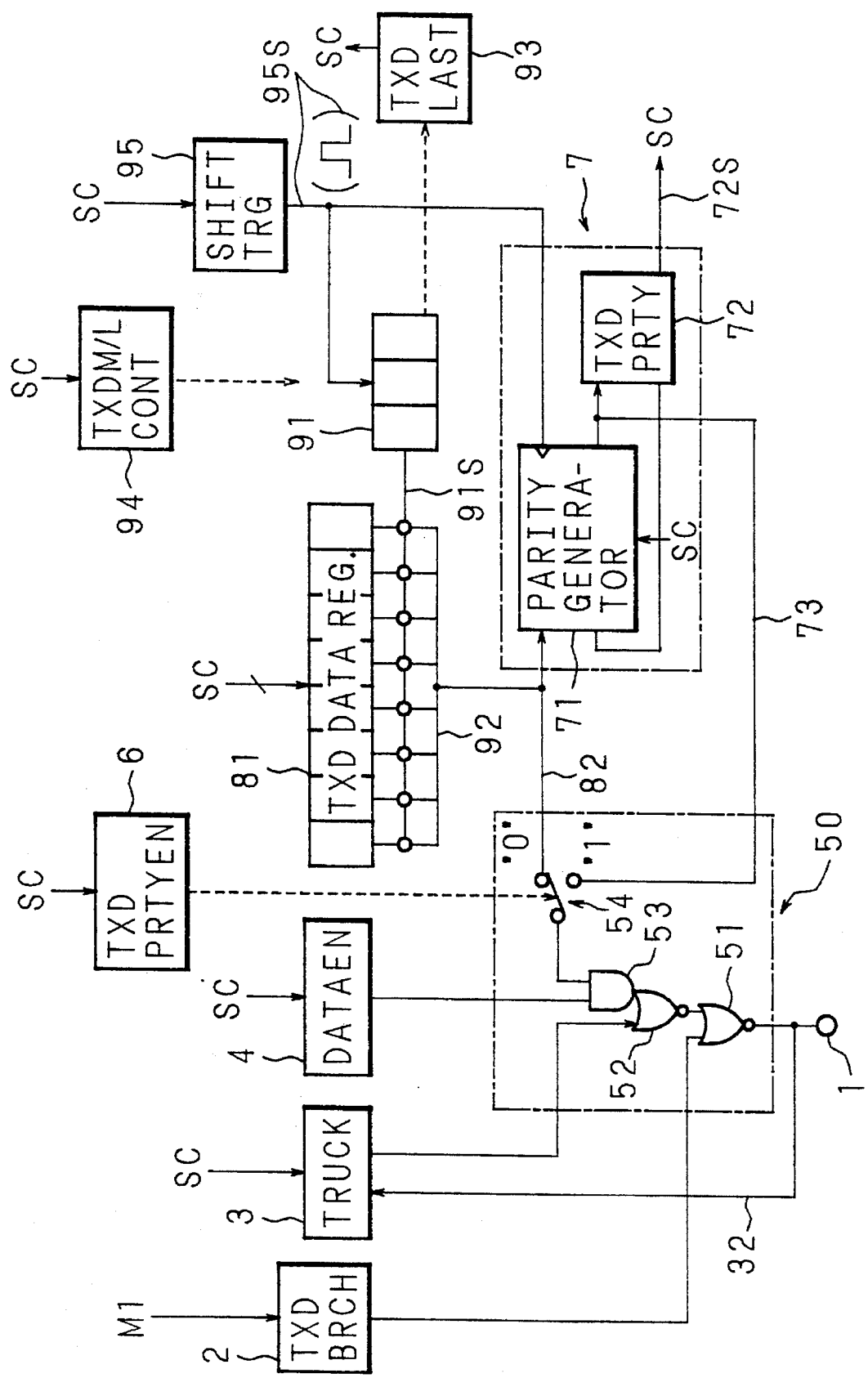
FIG. 4 is a block diagram showing a configuration example of a circuit of the transmit side of a serial communication circuit related to the invention.

FIG. 4 is a block diagram showing a configuration example of the transmit side circuit S4T of the serial communication circuit related to the invention. In FIG. 4, the respective registers (in FIG. 4, blocks shown by reference numerals 2, 3, 4, 6, 72, 81, 91, 93, 94, 95) in the TXD block S31 for the transmit side circuit S4T among the register file S3 of the aforementioned sub CPU SC are also shown.

In FIG. 4, reference numeral 1 designates, as aforementioned, an output terminal (hereinafter, to be called a transmit terminal) of the data transmitted by the serial communication circuit of the invention, that is the serial transmit data (TXD signal), and it outputs a signal of "H" level active.

This transmit terminal 1 outputs any one of a TXD data bit, 82, a truck bit written from the sub CPU SC to a truck register (TRUCK) 3, or a parity bit 73 generated by a parity generator 71 to be described later, which are selected by a switching circuit 50 composed of elements designated by reference numerals 51–54, corresponding to values of a TXD break character bit written from the main CPU M1 to a TXD break character register (TXDBRCH) 2 to be described later, a data enable bit written from the sub CPU SC to a data enable register (DATAEN) 4, and a TXD parity output enable bit written from the sub CPU SC to a TXD parity output enable register (TXDPRTYEN) 6.

The TXD break character bit inputted from the main CPU M1 to the TXD break character register 2 is a signal for finishing a communication forcibly, and is given to the switching circuit, 50. Such TXD break character bit as a value of "0" when an usual communication is performed, or as a value of "1" when a communication is made to be stopped, is written respectively into TXD break character register 2 by the main CPU M1.

By the way, this embodiment, as shown in FIG. 3, is premised on the assumption of a system in which two microcomputers of the main CPU M1 and the sub CPU SC are built in one LSI chip C, and the sub CPU SC for an exclusive communication function usually controls the circuit shown in FIG. 4. But, when the main CPU M1 detects something communication abnormal, the main CPU M1 writes the TXD break character bit of "1" to the TXD break character register 2, thereby the communication can be finished forcibly.

The data enable bit written from the sub CPU SC to the data enable register 4 is a signal for permitting the data transmission, and is given to the switching circuit 50.

The TXD parity output enable bit written from the sub CPU SC to the TXD parity output enable register 6 is a signal for permitting the output of the parity bit 73 to be described later, and is given to the switching circuit 50.

The switching circuit 50 is composed of the NOR gates 51, 52, the AND gate 53 and the switch 54.

The switch 54 is switch-controlled by a value of the TXD parity output enable bit written by the sub CPU SC to the aforementioned TXD parity output enable register 6. That is, the switch 54 is so controlled that the TXD data bit 82 is inputted to the first input terminal of the AND gate 53 when the TXD parity output enable bit is "0", and that the parity bit 73 is inputted when "1". To the other input terminal of the AND gate 53, the data enable bit having been written in the data enable register 4 is inputted, and the output thereof is inputted to one input terminal of the NOR gate 52. To the other input terminal of the NOR gate 52, a truck bit having been written in the truck register 3 is inputted, and the output thereof is inputted to one input terminal of the NOR gate 51. To the other input terminal of the NOR gate 51, the TXD break character bit having been written in the TXD break character register 2 is inputted.

Accordingly, the relationship between the values respectively written in the TXD break character register 2, the data enable register 4, and the TXD parity output enable register 6, and the signal outputted from the transmit terminal 1 is as shown in FIG. 5.

Specifically, the contents shown in FIG. 5 is as follows.

When the main CPU M1 writes the TXD break character bit of "1" to the TXD break character register 2, the output signal from the transmit terminal 1 is made "L" level forcibly and the transmission is forbidden.

When the main CPU M1 writes the TXD break character bit of "0" to the TXD break character register 2, the transmission from the transmit terminal 1 is enabled. That is, when the sub CPU SC writes the data enable bit of "0" to the data enable register 4, the truck bit written by the sub CPU SC to the truck register 3 is outputted from the transmit terminal 1. When the sub CPU SC writes only the data enable bit which has been made "1" to the data enable register 4, the TXD data bit 82 is outputted from the transmit, terminal 1. When the sub CPU SC makes both the data enable bit and the TXD parity output enable bit "1" and writes them to the data enable register 4 and the TXD parity output enable register 6, the parity bit 73 is outputted from the transmit terminal 1.

By the way, in the D2B protocol which is an object of the serial communication circuit of the invention, as shown in the aforementioned timing chart of FIG. 1, the arrangement of the t1 section of "H" level, t2 section of "L" level, t3 section which is a section of the data to be transmitted, and finally the t4 section of "H" level from the head side of one bit of a transmit signal and the widths of the respective sections (specifically, the number of clocks) are defined. It is a truck bit that is used for setting the levels of the respective sections. That is, by making the truck bit valid ("1") in accordance with the table shown in FIG. 5 and writing "1" or "0" from the sub CPU SC to the truck register 3, it becomes possible to make the levels of the respective sections predetermined values.

In addition, the truck register 3 also has a function to confirm again the level of the signal outputted from the transmit terminal 1 by feedbacking the output of the NOR gate 51 of the switching circuit 50 by the route 32. That is to say, in the truck register 3, a latch of one bit set-table by writing data of the truck bit from the sub CPU SC and the input route 32 of one bit reading the TXD signal itself outputted From the transmit terminal 1, are allocated in the same address and same bit.

The data transmit section t3 shown in FIG. 1 is a section for transmitting the data itself, however, the switch 54 selects the TXD data bit 82 to output it by that usually the sub CPU SC writes the TXD parity output enable bit of "0" into the TXD parity outpost enable register 6. But some protocols sometimes add the parity of a word after transmitting the data by one word unit. In such a case, the switch 54 selects the parity bit 73 to output it by that the sub CPU SC writes the TXD parit output enable bit of "1" into the TXD parity output enable register 6

In the following, explanation will be made on the data transmission and the parity.

Reference numeral 81 is a TXD data register (transmit data register) of an 8-bit configuration, and the TXD data register 81 is capable of storing a transmit data of 8 bits through the bus S5 from the sub CPU SC. Numeral 92 designates a selector, which selects one bit among the respective bits of the TXD data register 81 so as to output it as the TXD data bit 82.

Reference numeral 91 designates a TXD pointer of a 3-bit configuration for controlling the selection operation done by the aforementioned selector 92. Specifically, the TXD pointer 91 is configured as an up/down counter, and is capable of selecting to make the head of the transmit data be the MSB or the LSB by that the sub CPU SC writes "1" or "0" as an MSB/LSB first control bit to an MSB/LSB first register (TXDM/LCONT) designated by reference numeral 94 so as to select counting up or counting down.

This TXD pointer 91 is counter-triggered by that the sub CPU SC writes "1" with software to a shift trigger register (SHIFTTRG) designated by reference numeral 95 and a shift trigger 95S which is a transmit trigger signal is generated. In addition, this shift trigger 95S becomes also a trigger of a parity generator 71 to be described later.

When the TXD pointer 91 overflows at the last bit, "1" is written as a TXD last data bit to a TXD last, data register (TXDLAST) designated by reference numeral 93.

Also the TXD pointer 91 can be accessed from the sub CPU SC and is capable of setting optionally an initial value. By utilizing this function, it is possible to output data as the TXD data bit 82 from an optional bit among 8 bits of the TXD pointer 91, or also possible to output data of 8 bits or more as the TXD data bit 82. In order to utilize such a function effectively, in this embodiment, the TXD data register 81 is not dared to be configured as a shift register.

Reference numeral 71 designates, as aforementioned, a parity generator, which is so constructed that, the TXD data bit 82 outputted from the TXD data register 81 by the selector 92 is inputted therein, and the TXD bit 82 is counted at the falling edge of the shift trigger 95S generated by the shift trigger register 95, and which is a kind of one-bit counter gated at the TXD data bit 82. It is also possible to set an initial value of this counter from the sub CPU SC, and by utilizing this function, it is possible to select even number parity mode or odd number parity mode. The parity obtained by this parity generator 71 is held in the parity bit register (TXDPRTY) 72, and further, it can be read from the sub CPU SC.

The aforementioned truck bit written into the truck register 3, the data enable bit written into the data enable register 4, the TXD parity output enable bit written into the TXD parity output enable register 6, the parity bit read out to the parity bit register 72, the data set to the TXD data register 81, the data set, to the TXD pointer 91, the TXD last data bit written into the TXD last data register 93, the MSB/LSB first control bit written into the MSB/LSB first control register 94, and the shift trigger written into the shift trigger register 95, can be accessed from the sub CPU SC. The TXD break character bit written into the TXD break character register 2 can be accessed from the main CPU M1, and from the sub CPU SC, only reading is possible.

Figure 6:
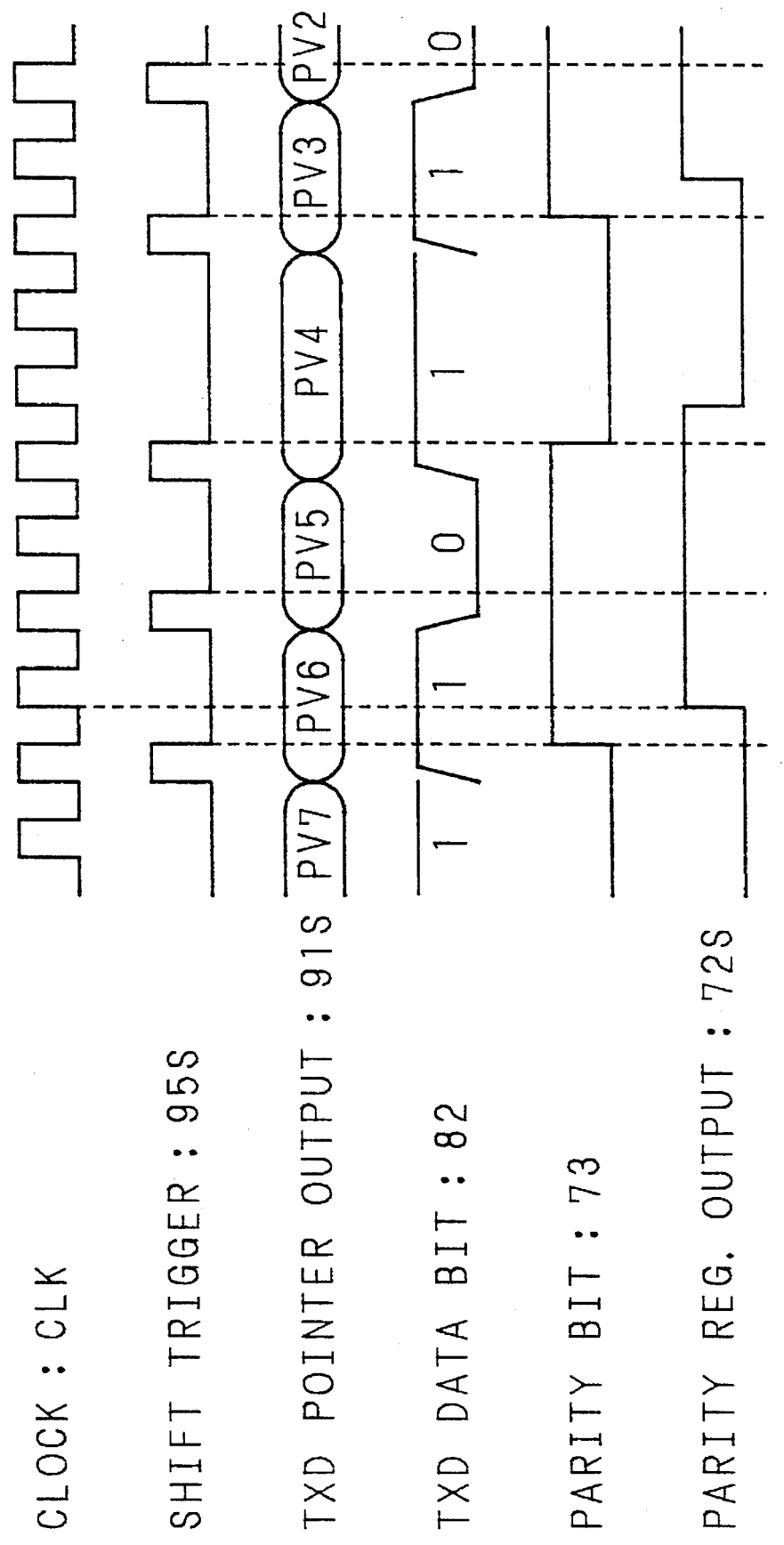
FIG. 6 is a timing chart showing a state in which parity bit of a circuit on the transmit side of a serial communication circuit related to the invention is generated.

Explanation will be made on the operation of the transmit side circuit S4T of the serial communication circuit of the invention of such a configuration as aforementioned. In addition, FIG. 6 is a timing chart showing a state of the output of the TXD data bit 82 from the TXD data register 81 and the generation of the parity bit at the parity generator 71. But, for the convenience of the explanation of the parity generation, in FIG. 6, the number of clocks are largely omitted as compared with the actual number of cycles.

In the following explanation, the main CPU M1 is assumed to write the TXD break character bit of "0" to the TXD break character register 2.

The clock CLK shown in FIG. 6 is the clock CLK which defines the operation of the serial communication circuit S4 of the present invention shown in FIG. 3.

In case of transmitting one-bit data, at first, the sub CPU SC inputs the data enable bit of "0" to the data enable regist 4 over the time combining the pulse width of the t1 section and the pulse width of the t2 section. At the same time, the sub CPU SC at first writes the truck bit of "1" to the truck register 3, and next, at the time point when the time corresponding to the pulse width of the t1 section has passed, writes the truck bit of "0" to the truck register 3. Thereby, from the transmit terminal 1, a signal of "1" is outputted over the time corresponding to the time of t1 section, and next, a signal of "0" is outputted over the time corresponding to the t2 section.

Next, the sub CPU SC writes the data enable bit of "1" to the data enable register 4 and the TXD parity output enable bit of "0" to the TXD parity output enable register 6, over the time corresponding to the pulse width of the t3 section. Thereby, one bit among the data stored in the TXD data register 81 is selected as the TXD data bit 82 and outputted from the transmit terminal 1 over the time corresponding to the pulse width of the t3 section.

Next, the sub CPU SC writes the data enable bit of "0", to the data enable register 4 over the time corresponding to the pulse width of the t4 section. At the same time, the sub CPU SC writes the truck bit of "1" to the truck register 3. Thereby, from the transmit terminal 1, a signal of "1" is outputted over the time corresponding to the t4 section.

For example, in the TXD data register 81, "1", "1", "0", "1", "1", "0" . . . as data D7, D6 . . . of 8 bits are assumed to be set by the sub CPU SC. And the MSB/LSB first control bit is assumed to be set by the sub CPU SC so that MSB is selected in the MSB/LSB first control register 94.

At first, at the last of the first t2 section, the sub CPU SC writes "1" to the shift trigger register 95 to generate the shift trigger 95S, and from the TXD pointer 91, a pointer value PV7 is outputted as the TXD pointer output 91S and is given to the selector 92. Thereby, from the TXD data register 81, a value "1" of the data D7 which is the MSB is outputted as the TXD data bit 82. At, this time point, as aforementioned, since only the data enable bit to be written into the data enable register 4 among the TXD break character bit, the data enable bit, and the TXD parity output enable bit is made "1", the TXD data bit 82 of "1" is outputted from the transmit, terminal 1.

In the following, by the same processing, in the next t2 section, values "1", "0" . . . of the data D6, D5 . . . set in the TXD data register 81 are outputted successively from the transmit terminal 1.

And every time the data is outputted as the TXD data bit 82 successively from the TXD data register 81, the parity bit 73 is outputted from the parity generator 71 in synchronism with the falling of the shift trigger 95S, and is held in the parity bit register 72 in synchronism with the rising of the next clock CLK as well as is outputted to the sub CPU SC as the parity register output 72.

As aforementioned, when the parity bit 73 is transmitted after data of, for example, one word of 8 bits, is outputted from the TXD data register 81, the TXD parity output enable bit of "1" is written to the TXD parity output enable register 6 with the data enable bit of "1" still remained written in the data enable register 4, then the switch 54 is switched and the parity bit 73 is outputted from the transmit terminal 1.

Figure 7:
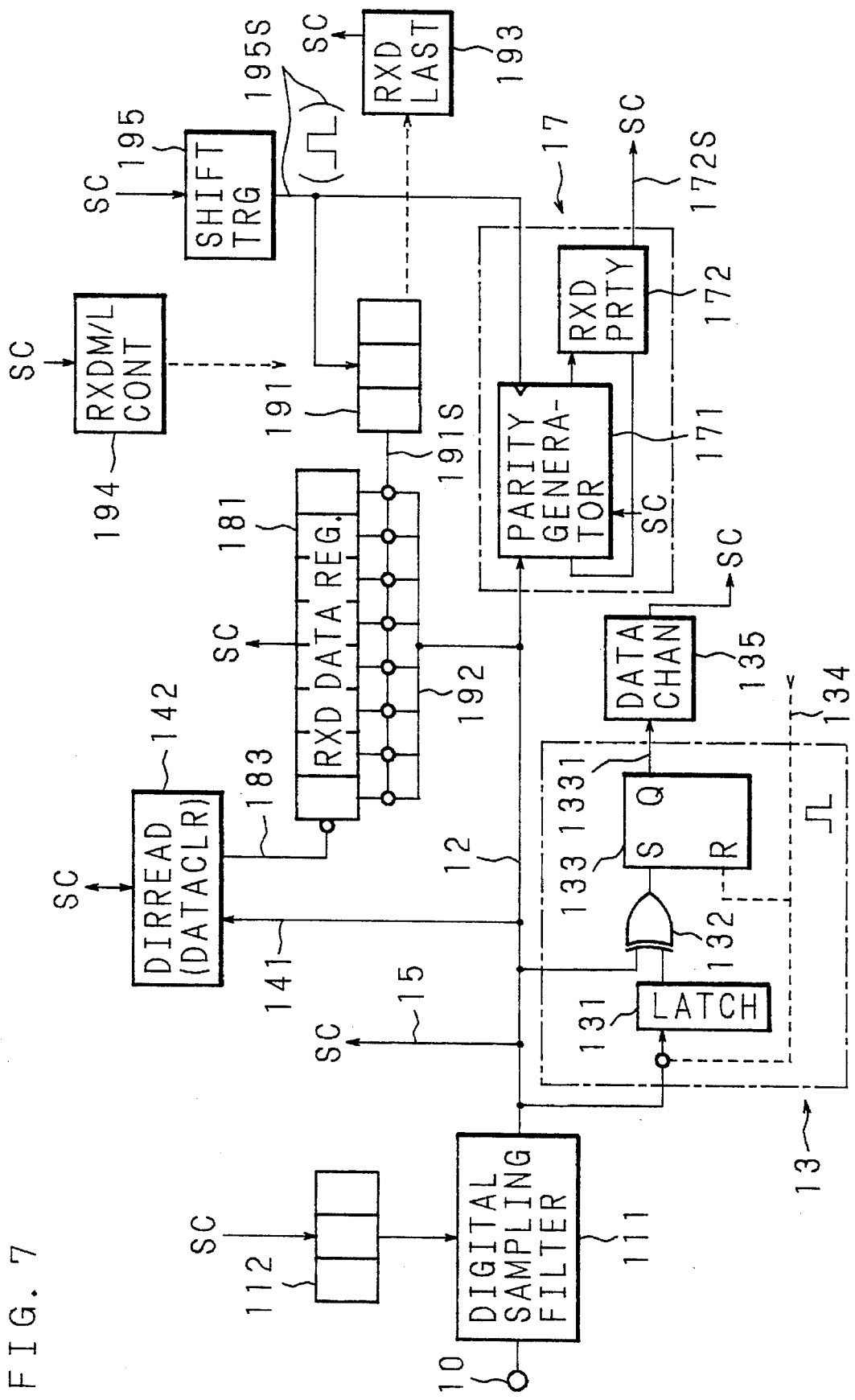
FIG. 7 is a block diagram showing a configuration example of a circuit of the receiving side of a serial communication circuit related to the invention.

FIG. 7 is a block diagram showing a configuration example of the receiving side circuit S4R of the serial communication circuit of the invention.

In FIG. 7, reference numeral 10 designates a receiving terminal of data received by the serial communication circuit of the invention, that is, serial receiving data (RXD signal), and the terminal 10 inputs a signal of "H" level active. The receiving terminal 10, in multi master communication method, is connected to a communication line through an outside buffer circuit together with the aforementioned transmit terminal.

Reference numeral 111 designates a digital sampling filter, which samples the RXD signal inputted to the receiving terminal 10 to noise-cut with a frequency set in an RXD data filter clock select register designated by numeral 112.

For the RXD data de ignated by numeral 12 obtained after passing through the digital sampling filter 111, five kinds of circuits having different functions from each other to be described later are connected respectively.

At first, reference numeral 141 designates a signal line for reading the RXD data bit 12 directly to the sub CPU SC, which is connected to a direct read register (DIRREAD) 142. The RXD data bit 12 written in the direct read register 142 by this signal line 141 is read out by the sub CPU SC.

Numeral 15 designates a signal line leading to an interrupt circuit in the, sub CPU SC, which generates a sub CPU interrupt to the respective rising and falling of the RXD data bit 12 and is capable of moving to an execution of a processing routine corresponding directly to a change of received data.

Numeral 13 designates a circuit for detecting a change of a signal of the RXD data bit 12. Numeral 131 designates a latch for holding a value of one bit of the RXD data bit 12, which latches the value of the RXD data bit 12 in accordance with a pulse signal by a "1" writing signal designated by numeral 134 from the sub CPU SC. The value latched by this latch 131 and the value of the RXD data bit 12 which changes in time series after the value latched by the latch 131 are detected whether they are coincident with each other or not, and when they are not coincident with each other, an R-S flip flop 133 is set.

The set/reset of the R-S flip flop 133 can be read out to a data change register (DATACHAN) 135 by the sub CPU SC, thereby the sub CPU SC can know whether or not the RXD data bit, 12 held in the latch 131 at the timing of the "1" writing signal 134 from the sub CPU SC has changed its level after that time point.

Figure 8:
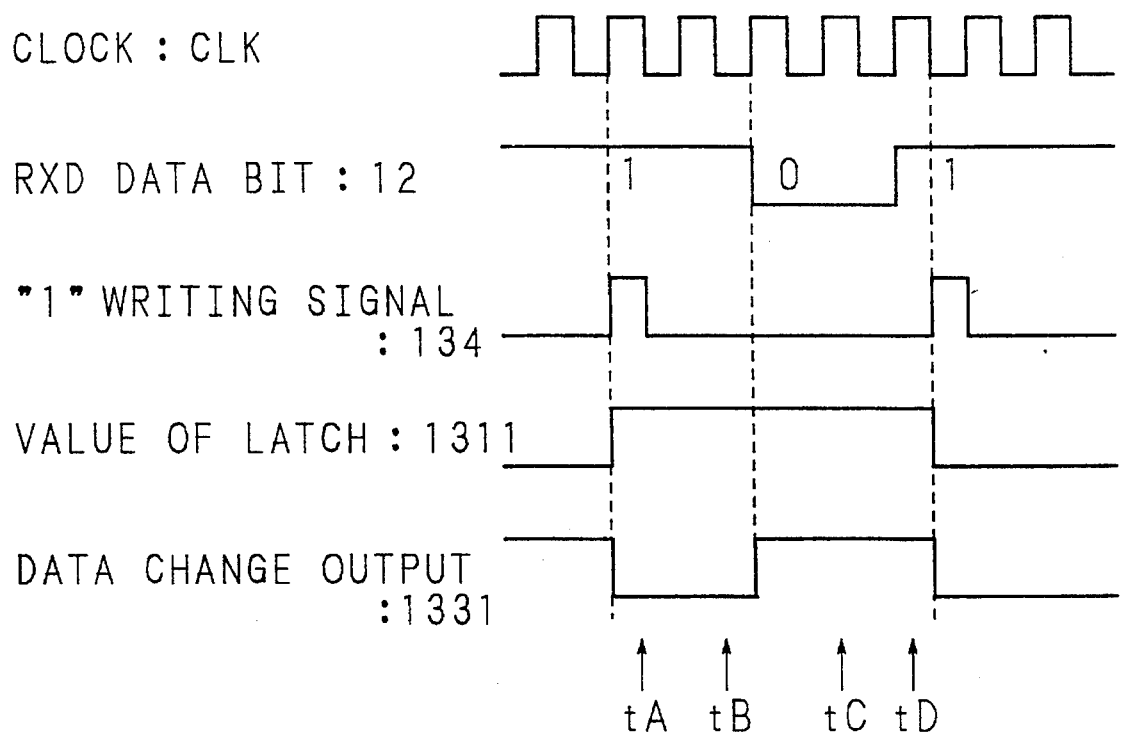
FIG. 8 is a timing chart showing an operation state of a circuit for detecting change of a received signal of a circuit of the receiving side of a serial communication circuit related to the invention.

The state is shown in the timing chart of FIG. 8.

At the time point tA, the latch 131 is given the "1" writing signal 134 from the sub CPU SC and takes in the value "1" of the RXD data bit, 12 as a value 1331 of itself. At the time point of tB, since the signal value of the RXD data bit 12 still does not change, the data change output 1331 which is the output signal of the R-S flip flop keeps "L" level. But, since before the time point tC or tD, the RXD data bit 12 temporarily changes to "L" level, at these time points, the data change out, put 1331 from the R-S flip flop 133 changes to "H" level. Since this function is capable of detecting the presence or absence of a noise larger than a noise which a digital sampling filter 111 can remove, it becomes a subject for judging whether a signal in a predetermined section is stable or not, or whether there is something abnormal in a communication.

In FIG. 7, the ones designated by reference characters 17, 18 and 19 have contrast functions with the aforementioned parity generator 71, TXD data register 81, and TXD pointer 91 respectively, and operate almost in the same way.

Numeral 181 designates an RXD data register (a data register for receiving) of 8-bit configuration, which takes in the respective bits of the RXD data bit 12. The data taken into this RXD data register 181 can be read by the sub CPU SC through the data bus.

Numeral 192 designates a selector, which selects one bit among the respective bits of the RXD data register 181 to make the RXD data bit 12 input.

Numeral 191 designates an RXD pointer of 3-bit configuration for controlling the selection operation done by the aforementioned selector 192. Specifically, the RXD pointer 191 is constructed as an up/down counter, and is capable of selecting whether to make the head of a received data MSB or LSB by that the sub CPU SC writes "1" or "0" as an MSB/LSB first control bit to an MSB/LSB first control register (RXDM/LCONT) designated by numeral 194 to select the up count or down count.

This RXD pointer 191 is counter-triggered by that the sub CPU SC writes "1" with software to a shift trigger register (SHIFTTRG) designated by numeral 195 so as to generate a shift trigger 195S. This shift trigger 195S also becomes a trigger of a parity generator 171 to be described later.

When the RXD pointer 191 overflows at the last bit, "1" is written as the RXD last data bit to the RXD last data register (RXDLAST) designated by numeral 193, and is read out from the sub CPU SC.

This RXD pointer 191 can also be accessed from the sub CPU SC and can set the initial value optionally. By utilizing this function, taking in data with an optional bit among 8 bits of the RXD pointer 191 as a head, or taking in data of 8 bits or more by that the sub CPU SC reads out data two times or more from the RXD data register 181, is possible. In order to utilize such a function effectively, in this embodiment, the RXD data register 181 is not dared to be constructed as a shift register.

In addition, the value of the RXD data register 181 can clear all of 8-bit data by that the sub CPU SC writes "0" to a direct read register 142 so as to give it to the RXD data register 181 as an all clear signal 183. In other words, in this case, the direct read register 142 functions as a data clear register (DATACLR).

Numeral 171 designates a parity generator as aforementioned, which is so constructed that the respective bits of the RXD data bit 12 having been inputted to the RXD data register 181 is inputted and counted at the falling edge of the shift trigger 195S generated by that the sub CPU SC writes "1" to the shift trigger register 195, and which is a kind of a one-bit counter gated by the RXD data bit 12. From the sub CPU SC, it is possible to set an initial value of the parity generator 171 as a counter, and it is also possible to select a mode of even number parity or a mode of odd number parity by utilizing this function. The parity obtained by the parity generator 171 can be read out to the parity bit register (RXDPRTY) 172 of one-bit configuration.

Accordingly, by that the sub CPU SC reads from the direct read register 142 parity bit in the data received from the receiving terminal 10 and reads a parity from the parity bit register 172 to compare them with each other so as to perform a parity check, the sub CPU SC can judge whether the received data is right or wrong. When the result of the parity check shows uncoincidence, the sub CPU SC judges it to be a communication abnormality and performs a processing for re-communication.

All of the aforementioned RXD data filter clock select register 112, R-S flip flop 133, "1" writing signal 134, direct read register 142, parity bit register 172, RXD data register 181, all clear signal 183, RXD pointer 191, RXD last data register 193, MSB/LSB first control register 194, and shift, trigger register 195 can be accessed from the sub CPU SC. Especially, a function between the signal line 141 and the all clear signal 183 which are connected to the direct read register 142 and a function between the R-S flip flop 133 and "1" writing signal from the sub CPU SC are allocated to the same address and same bit in order that an operation can be done by a same register, thereby arrangement of special function registers which are apt to be lacking is realized by dividing the function into writing function and reading function.

Figure 9:
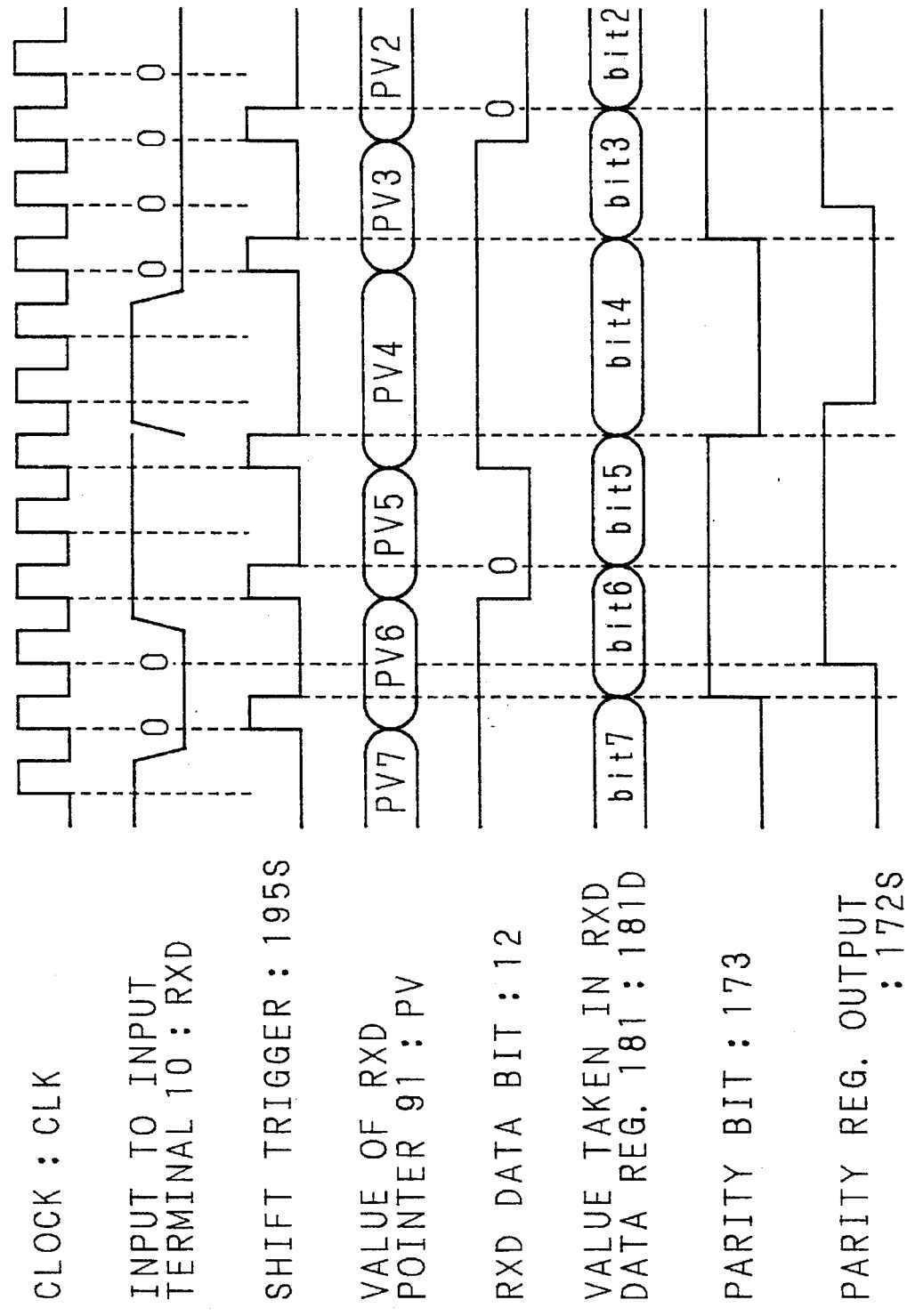
FIG. 9 is a timing chart showing a state in which parity bit of a circuit of the receiving side of a serial communication circuit related to the invention is generated.

Explanation will be made on the operation of the receiving side circuit S4R of the serial communication circuit of the invention having such a configuration as aforementioned. FIG. 9 is a timing chart showing an operation in which a received signal from the receiving terminal 10 is taken in to the RXD data register 181 and a generation state of parity bit in the parity generator 171. But, in FIG. 9, in the same way as in FIG. 6, for the convenience of the explanation of parity generation, the number of clocks are largely omitted as compared with an actual number of cycles.

When one-bit data is received, at first, the sub CPU SC reads out an input signal RXD given to the receiving terminal 10 from the digital sampling filter 111, signal line 141 through the direct read register 142, and detects with software the timing of the RXD data bit 12 to be taken in the RXD data register 181.

When the sub CPU SC detects the timing of taking in data to the RXD data a register 181, it writes "1" to the shift trigger register 195 to generate the shift trigger 195S. In synchronism with the rising timing of this shift trigger 195S, the pointer value PV of the RXD pointer 191 changes as PV7, PV6 . . . , and to the bit of the RXD data register 181 corresponding to the pointer value PV of this RXD pointer 191, the value of the RXD data bit 12 is taken in synchronism with the falling of the shift trigger 195S.

In the following, in the same way, every time the sub CPU SC detects the timing of taking in data to the RXD data register 181, it, makes the respective bits of the RXD data register 181 to take in the values of the respective bits of bit, 7, bit 6, bit 5 . . . of the RXD data bit 12 as shown by reference character 181D.

And the data taken in successively to the RXD data register 181 is also inputted to the parity generator 171, and every time the data is taken in successively to the RXD data register 181, the parity bit 173 is outputted from the parity generator 171 in synchronism with the falling of the shift trigger 195S and is held in the parity bit register 172 in synchronism with the rising of the next clock CLK, and is output reel as a parity register output 172S to the sub CPU SC.

As described in the above, according to the serial communication circuit of the invention, the configuration is such that the sub CPU SC for exclusive communication control is provided on the LSI chip, and communication protocol of a complicated timing definition in the viewpoint of software is processed by the sub CPU SC, it becomes possible to process a communication protocols of different timing definition only by changing the firmware.

And according to the serial communication circuit of the invention, it is possible to check parities of odd number or parities of even member, thereby leading to communication accuracy.

Further, according to the serial communication circuit of the invention, it is possible to check whether there is a noise included in a received signal or not, whether a signal in a predetermined section is stable or not, or further, whether there is something abnormal in a communication or not, thereby performing a stable communication.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. A serial communication circuit for a communication protocol, which represents a predetermined meaning according to a signal of one unit composed of a plurality of sections obtained by combining high level sections and low level sections respectively having different time widths with each other and represents data of a first value or a second value by a signal of one unit having a data section in which high level or low level can be set optionally, comprising:

a control circuit;

a transmit terminal;

a receiving terminal;

a transmit data register which is given data of a plurality of bits to be transmitted from said transmit terminal and holds it therein;

a transmit pointer which designates successively bits of data held in said transmit data register;

a first register which makes said transmit pointer designate bit of said transmit data register, as well as generates a transmit trigger signal which makes data of bits designated by said transmit pointer outputted from said data register when a first value is written from said control circuit;

a second register to which a first value or a second value can be written from said control circuit, corresponding to a signal level to be transmitted from said transmit terminal;

a third register to which a first value or a second value to be transmitted from said transmit terminal can be written from said control circuit after selecting a content of said second register or said transmit data register;

a receiving data register which holds data of a plurality of bits to be received from said receiving terminal so as to make said control circuit to read it;

a receiving pointer which designates successively bits of data to be held in said receiving data register;

a fourth register which makes said receiving pointer designate bit of said receiving data register, as well as generates a receiving trigger signal which makes bit of said receiving data register designated by said receiving pointer take in a value of a signal inputted from said receiving terminal when the first value is written from said control circuit; and a fifth register which makes said control circuit read a signal received from said receiving terminal directly;

wherein said control circuit at the time of transmitting according to a predetermined program, writes a first or a second value to said second register every time a time determined in said program is passed, writes the first value to said first register at a time corresponding to said data section so as to give said transmit trigger signal to said transmit pointer and said transmit data register as well as writes the first value or the second value to said third register, thereby transmits each signal of one unit from said transmit terminal, and at the time of receiving according to a predetermined program, reads out from said fifth register a signal received from said receiving terminal so as to recognize a meaning of each signal of one unit, writes the first value to said fourth register at a time corresponding to said data section and gives said receiving trigger signal to said receiving pointer and to said receiving data register, thereby data is taken to said receiving data register.

2. A serial communication circuit as set forth in claim 1, wherein said control circuit is a sub CPU for exclusive communication of a one-chip microcomputer configured on an LSI chip.

3. A serial communication circuit as set forth in claim 1, further comprising:

a parity generator for transmitting which is capable of writing a first value or a second value from said control circuit, takes in a value of each bit outputted from said transmit data register in synchronism with said transmit trigger signal, as well as obtains parities of odd number or even number corresponding to a value written from said control circuit; and a parity generator for receiving which is capable of writing a first value or a second value from said control circuit, takes in a value of each bit taken in to said receiving data register in synchronism with said receiving trigger signal, as well as obtains parities of odd number or even number corresponding to a value written from said control circuit.

4. A serial communication circuit as set forth in claim 1, further comprising:

a latch which latches a value of a signal inputted from said receiving terminal according to a timing determined in a program by said Control circuit;

comparing means for comparing a value of a signal inputted from said receiving terminal with a value latched in said latch;

storing means for storing a signal of a predetermined value when a comparison result by said comparing means shows non-coincidence; and means for making said control circuit read a value stored in said storing means.

* * * * *